United States Patent
Jo et al.

(10) Patent No.: US 8,942,703 B2
(45) Date of Patent: *Jan. 27, 2015

(54) METHOD FOR SWITCHING SERVICE OF MANAGEMENT DEVICE SERVING NETWORK OR DEVICE

(75) Inventors: Junho Jo, Anyang-si (KR); Suhwook Kim, Anyang-si (KR); Bonghoe Kim, Anyang-si (KR)

(73) Assignee: LG Electronics Inc., Seoul (KR)

(*) Notice: Subject to any disclaimer, the term of this patent is extended or adjusted under 35 U.S.C. 154(b) by 141 days.

This patent is subject to a terminal disclaimer.

(21) Appl. No.: 13/697,340

(22) PCT Filed: Nov. 16, 2011

(86) PCT No.: PCT/KR2011/008745
§ 371 (c)(1),
(2), (4) Date: Nov. 9, 2012

(87) PCT Pub. No.: WO2012/134022
PCT Pub. Date: Oct. 4, 2012

(65) Prior Publication Data
US 2013/0059588 A1 Mar. 7, 2013

(51) Int. Cl.
*H04W 36/00* (2009.01)
*H04B 17/00* (2006.01)
(Continued)

(52) U.S. Cl.
CPC ............ *H04W 72/082* (2013.01); *H04W 16/14* (2013.01)
USPC ...................... 455/436; 455/67.13; 455/452.1; 455/414.1

(58) Field of Classification Search
USPC ............ 455/67.1, 67.11, 67.13, 414.1, 414.2, 455/414.3, 436, 450, 451, 452.1, 454
See application file for complete search history.

(56) References Cited

U.S. PATENT DOCUMENTS

2010/0003988 A1* 1/2010 Buckley et al. ............... 455/436
2011/0296475 A1* 12/2011 Craner ........................... 725/90
(Continued)

FOREIGN PATENT DOCUMENTS

JP 2013-545365 12/2013
KR 10-2010-0097497 9/2010
(Continued)

OTHER PUBLICATIONS

PCT International Application No. PCT/KR2011/008745, Written Opinion of the International Searching Authority dated Jul. 19, 2012, 10 pages.
(Continued)

*Primary Examiner* — Christopher M Brandt
(74) *Attorney, Agent, or Firm* — Lee, Hong, Degerman, Kang & Waimey

(57) ABSTRACT

Disclosed is a method for smoothly switching between services to allow networks or devices to coexist. The method of switching between services of a television band device (TVBD) network or device includes: receiving a request for switching between services of the TVBD network or device from a coexistence manager (CM); and transmitting a response with respect to the request to the CM, wherein the services include an information service obtaining, by the TVBD network or device, neighbor information of the TVBD network or device from the CM and a management service providing measurement results to the CM by the TVBD network or device, and the response includes an indicator indicating whether or not the request has been successfully processed.

12 Claims, 13 Drawing Sheets

(51) Int. Cl.
*H04W 72/00* (2009.01)
*H04M 3/42* (2006.01)
*H04W 72/08* (2009.01)
*H04W 16/14* (2009.01)

(56) References Cited

U.S. PATENT DOCUMENTS

2012/0094681 A1* 4/2012 Freda et al. ............... 455/452.1
2012/0106461 A1* 5/2012 Kasslin et al. ............. 370/329
2012/0108179 A1* 5/2012 Kasslin et al. ............. 455/67.13
2012/0230250 A1* 9/2012 Kasslin et al. ............. 370/328

FOREIGN PATENT DOCUMENTS

KR 10-2010-0114828 10/2010
WO 2010/114640 10/2010

OTHER PUBLICATIONS

Kwak, et al., "Coexistence Services System Proposal," IEEE P802.19.1 Wireless Coexistence Task Group, Nov. 2010, 31 pages.

* cited by examiner

FIG. 15A

COEX_servicechanging. request (
        DestinationIdentifier
        ServiceType
)

FIG. 15B

COEX_servicechanging. indication (
        SourceIdentifier
        ServiceType
)

FIG. 15C

COEX_measurment. response (
        DestinationIdentifier
        ResultCode
)

FIG. 15D

COEX_measurement. confirm(
        SourceIdentifier
        ResultCode
)

METHOD FOR SWITCHING SERVICE OF MANAGEMENT DEVICE SERVING NETWORK OR DEVICE

CROSS-REFERENCE TO RELATED APPLICATIONS

This application is the National Stage filing under 35 U.S.C. 371 of International Application No. PCT/KR2011/008745, filed on Nov. 16, 2011, which claims the benefit of U.S. Provisional Application Ser. No. 61/468,063, filed on Mar. 27, 2011, U.S. Provisional Application Ser. No. 61/469,061, filed on Mar. 29, 2011, and U.S. Provisional Application Ser. No. 61/469,068, filed on Mar. 29, 2011, the contents of which are all hereby incorporated by reference herein in their entirety.

TECHNICAL FIELD

The present invention relates to a method for switching a service of a management device serving a network or device.

BACKGROUND ART

Conventionally, allotment of frequency for a new service or allotment of frequency to new service providers was led by the government.

In particular, when new corners have entered, the government allotted a new frequency to them through an auction, or the like, or collects an existing frequency from an existing service provider and re-deploy it for a different service provide, thereby allotting frequency as limited resource.

However, recently, as demand for wireless data traffic is explosively increased in the wake of the spreading of various wireless Internet-based applications such as open germinal platform, App store, mobile VoIP, and the like, the government-driven frequency allotment is considered very ineffective and it is increasingly difficult to secure a new frequency on a table of frequency allocation fundamentally.

In particular, in line with the rapid growth of broadcast and communication systems, next-generation communication systems have been designed in a converged form of several networks and increasingly complicated, and the necessity of interaction or interworking is extending. Also, development of communication technologies and services has increased the frequency of use in frequency resources and the occupancy of a particular frequency band in a fixed manner to provide excellent communication techniques and services has caused severe depletion of frequency Recently, a frequency sharing scheme has come to prominence as a solution to the problems. This starts from a point of view that the current frequency shortage phenomenon is resulted from an existing partition type frequency management scheme and, although frequency appears to be insufficient on the table of frequency allocation but such frequency shortage can be solved through a sharing scheme.

As the depletion of frequency resources has been admitted to be significant worldwide, FCC (Federal Communications Commission) to the US decided to apply a cognitive radio technology, a frequency sharing technology, to a TV white space and revised a relevant regulation.

Such a movement is gradually extending, and in 2009, England has permitted the use of a CR (Cognitive Radio)-based frequency sharing technology in a band, included in a TV broadcast band, which is not spatially used, namely, a white space band. EU is discussing the introduction of the CR-based frequency sharing technology, and, also domestically, preparations for a frequency sharing policy using the white space band are being made.

The CR technology refers to a system in which a communication device observes a communication environment by itself, determines and selects an operation scheme for optimum communication, and makes a plan for a future determination process from a previous communication experience. Namely, the CR technology locates idle resource (spectrum hole, white space) which has low utilization or is temporally/spatially not used among frequency bands allocated to unlicensed band, and adaptively and opportunistically uses it. In this case, when a primary user having a license for a corresponding band is discovered, the use of the corresponding band should be stopped or transmit power is adjusted not to cause damage to the primary user.

DISCLOSURE

Technical Problem

An embodiment disclosed in the present disclosure aims at substantially discover a network or device in a neighbor relationship by using occupied channel information and interference level information of a network or device during a neighbor discovery process.

Another embodiment disclosed in the present disclosure aims at effectively avoiding an interference relationship by using occupied channel information of a neighbor network or device during a resource allocation process.

Another embodiment disclosed in the present disclosure aims at smoothly switching service modes provided in a coexistence system.

Technical Solution

According to an aspect of the present invention, there is provided a method of switching between services of a television band device (TVBD) network or device, including: receiving a request for switching between services of the TVBD network or device from a coexistence manager (CM); and transmitting a response with respect to the request to the CM, wherein the services include an information service obtaining, by the TVBD network or device, neighbor information of the TVBD network or device from the CM and a management service providing measurement results to the CM by the TVBD network or device, and the response includes an indicator indicating whether or not the request has been successfully processed.

In an embodiment, the neighbor information may be information obtained by the CM from a server, and the server may determine a neighbor TVBD network or device interfering the TVBD network or device.

In an embodiment, the method may further include: receiving information regarding operating channels of another CM from the CM.

In an embodiment, the information regarding the operating channels of said another CM may be information obtained by the CM from the different CM.

In an embodiment, the method may further include: transmitting the measurement results to the CM.

In an embodiment, the transmitting of the measurement results may be transmitting the measurement results to the CM periodically or according to a request from the CM.

According to another aspect of the present invention, there is provided a method of switching between services of a television band device (TVBD) network or device, including: transmitting a request for switching between services of the TVBD network or device to a coexistence manager (CM); and receiving, by the TVBD network or device, a response with respect to the request from the CM, wherein the services include an information service obtaining, by the TVBD network or device, neighbor information of the TVBD network or device from the CM and a management service providing measurement results to the CM by the TVBD network or device, and the response includes an indicator indicating whether or not the request has been successfully processed.

In an embodiment, the method may further include: receiving, by the CM, neighbor information of the TVBD network or device from a server, wherein the server determines a neighbor TVBD network or device interfering the TVBD network or device.

In an embodiment, the method may further include: receiving information regarding operating channels of another CM from the CM.

In an embodiment, the information regarding operating channels of the different CM may be information received by the CM from said another CM.

In an embodiment, the method may further include: transmitting the measurement results to the CM.

In an embodiment, the transmitting of the measurement results may be transmitting the measurement results to the CM periodically or according to a request from the CM.

Advantageous Effects

According to an embodiment disclosed in the present disclosure, a network or device in a neighbor relationship can be substantially discovered by using occupied channel information and interference level information of a network or device during a neighbor discovery process.

Also, according to an embodiment disclosed in the present disclosure, an interference relationship can be more effectively avoided by using occupied channel information of a neighbor network or device during a resource allocation process.

In addition, according to an embodiment disclosed in the present disclosure, service modes provided in a coexistence system can be smoothly switched.

DESCRIPTION OF DRAWINGS

FIG. 15A is a view showing semantics of a service primitive of a coexistence service changing request according to an embodiment of the present disclosure.

FIG. 15B is a view showing semantics of a service primitive of a coexistence service change notification according to an embodiment of the present disclosure.

FIG. 15C is a view showing semantics of a service primitive of a coexistence service changing response according to an embodiment of the present disclosure.

FIG. 15D is a view showing semantics of a service primitive of a coexistence service change confirmation according to an embodiment of the present disclosure.

BEST MODES

Figure 1:
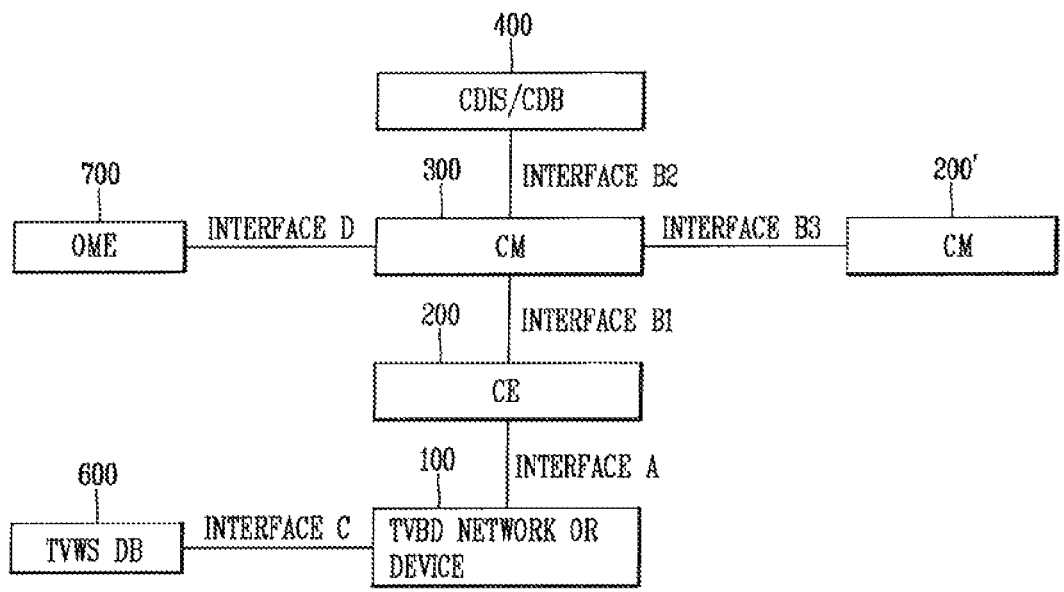
FIG. 1 is a schematic block diagram of a coexistence system according to an embodiment of the present disclosure.

The terminology used herein is for the purpose of describing particular embodiments only and is not intended to be limiting of the invention. Unless otherwise defined all terms used herein have the same meaning as commonly understood by one of ordinary skill in the art to which this invention pertains, and should not be interpreted as having an excessively comprehensive meaning nor as having an excessively contracted meaning. If technical terms used herein is erroneous that fails to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

In the present application, it is to be understood that the terms such as "including" or "having," etc., are intended to indicate the existence of the features, numbers, operations, actions, components parts, or combinations thereof disclosed in the specification, and are not intended to preclude the possibility that one or more other features, numbers, operations, actions, components, parts, or combinations thereof may exist or may be added.

While terms such as "first" and "second," etc., may be used to describe various components, such components must not be understood as being limited to the above terms. The above terms are used only to distinguish one component from another. For example, a first component may be referred to as a second component without departing from the scope of rights of the present invention, and likewise a second component may be referred to as a first component. The term "and/ or" encompasses both combinations of the plurality of related items disclosed and any item from among the plurality of related items disclosed.

When a component is mentioned as being "connected" to or "accessing" another component, this may mean that it is directly connected to or accessing the other component, but it is to be understood that another component may exist therebetween. On the other hand, when a component is mentioned as being "directly connected" to or "directly accessing" another component, it is to be understood that there are no other components in-between.

The exemplary embodiments of the present invention will now be described with reference to the accompanying drawings, in which like numbers refer to like elements throughout. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings. The technical idea of the present invention should be interpreted to embrace all such alterations, modifications, and variations in addition to the accompanying drawings.

Hereinafter, a term of terminal is used, and the terminal may be called by other names such as UE (User Equipment), ME (Mobile Equipment), MS (Mobile Station), UT (User Terminal), SS (Subscriber Station), MSS (Mobile Subscriber Station), wireless device, handheld device, or AT (Access Terminal).

IEEE 802.11 wireless local area network (WLAN) standard provides a transfer rate of 54 Mbps (IEEE 802.11a) using an unlicensed band at 2.4 GHz or 5 GHz.

IEEE 802.11g provides a transfer rate of 54 Mbps by applying an orthogonal frequency-division multiplexing (OFDM) at 2.4 GHz.

IEEE 802.11n provides a transfer rate of 300 Mbps with respect to four spatial streams by applying MIMO-OFDM. IEEE 802.11n supports a channel bandwidth of up to 40 MHz, and in this case, it provides a transfer rate of 600 Mbps.

TV whitespace (TVWS) includes VHF bands (54~60, 78~88, 174~216 MHz) and a UHF band (470~698 MHz) allocated to a broadcast TV system. The TV whitespace refers to a licensed frequency band permitted to be used by an unlicensed device under the conditions that the unlicensed device does not hamper communication of a licensed device (a TV, a wireless microphone, or the like) operating at a corresponding frequency band.

Meanwhile, TVWS, an acronym of TV white space, refers to an empty frequency band not used by a broadcast provider at a VHF and UHF frequency band distributed for a TV broadcast, and also refers to an unlicensed band any one may use when conditions for a propagation regulation are met. Namely, the TV white space may refer to frequency information for broadcasting. In detail, spatially, TV white space refers to a band empted to avoid frequency interference between broadcast providers, a frequency band not used by area, or an area broadcasting propagation does not reach, and temporally, TV white space refers to an empty broadcast frequency in a time duration in which a broadcast provider does not transmit a broadcast at dawn. Broadcast reception by a TV viewer as a client of a broadcast provider should not be interfered with, and a wireless microphone device performing communication by a small output by using a portion of the band (TVWS) should not also be influenced.

At bands of 512~608 MHz and 614~698 MHz, every unlicensed devices, except for some particular cases, are permitted to operate, but bands of 54~60 MHz 76~88 MHz, 174~216 MHz, and 470~512 MHz are permitted only for communication between fixed devices. A fixed device refers to a device that performs transmission only at a determined position.

An IEEE 802.11 TVWS terminal is an unlicensed device operating by using IEEE 802.11 MAC and PHY in a TV white space spectrum.

An unlicensed user who wants to use TV whitespace should provide a protection function with respect to a licensed user. Thus, before starting transmission in a TV band, whether or not a licensed user is occupying a corresponding band must be checked or ascertained To this end, the unlicensed device is connected to a geo-location database through the Internet or a dedicated network to obtain information regarding a list of channels which are available in a corresponding area. The geo-location database refers to a database storing and managing licensed devices registered thereto, location information of the licensed devices, and information regarding channels which are dynamically changed as devices use them over channel occupied time.

A station (STA) performs a spectrum sensing mechanism. Here, as the spectrum sensing mechanism, an energy detection scheme, a feature detection scheme, or the like, is utilized. When the strength of a reception signal is equal to or greater than a certain value or when a DTV preamble is detected, the station (STA) determines that an incumbent user is using a particular channel. When the station (STA) determines that an incumbent user is using a channel contiguous to a channel currently used by the STA or an access point (AP) connected to the STA, the STA and the AP should lower transmission power.

FIG. 1 is a schematic block diagram of a coexistence system according to an embodiment of the present disclosure. As shown in FIG. 1, a coexistence system according to an embodiment of the present disclosure includes a coexistence enabler (CE) 200, a coexistence manager (CM) 300, coexistence discovery and information server (CDIS) or a coexistence database (CDB) 400.

The coexistence manager (CM) 300 and the coexistence enabler (CE) 200 are logical entities defined for allowing different wireless systems or different wireless service providers operating in an unlicensed state to coexist. The CM 300 is an object which provides a policy or a guideline in relation to coexistence allowing different systems and different service providers having an interface with respect to a TVWS database and operating in the TVWS to coexist, and allocates resources to solve an interface problem between coexistence enablers (CEs) 200 connected thereto.

The coexistence enabler (CE) 200 has an interface with respect to a television band device (TVBD) network or device 100 and serves to transfer information or a command received from the CM 300 to the TVBD network or device 100. In the present disclosure, the STAs may perform the function of the CE 200, and a coexistence network structure in which a management entity such as the CM 300 exists as a higher object that may be able to control the plurality of CEs 200 will be handled.

The CE 200 receives information or a command in relation to coexistence from the CM 300. The CE 200 converts the received information and command into information or a command in a media-specific format and transfers the converted information or command to the TVBD network or device 100 for an operation of the TVBD network or device 100 required by a corresponding message. Similarly, information received from the TVBD network or device 100 may be converted into a message format defined in the coexistence system by the CE 200 and the transmitted to the CM 300. Since the CE 200 is disposed within the TVBD network or device 100, a service access point (SAP) and a primitive with an entity for managing the TVBD network or device 100 should be defined in order to allow the information or command for coexistence to be transferred.

The CM 300 may serve one or more CEs 200. The CM 300 may obtain required information from an external entity such as the TVWS database, the CEs 200 served by the CM 300 itself, or another CM 300. The CM 300 may transmit and receive information or a command message to and from the different CM 300 or transmit information or a command to the CE 200 served by the CM 300 itself. The CM 300 makes a coexistence decision based on the obtained information. Here, decision on an operation channel of the CE 200 served by the CM 300, a maximum transmission power value, and the like, may be included in the decision.

The TVBD network or device 100 may be an unlicensed user who uses a TV band, or the TVBD network or device 100 may be a device or a network. For example, the TVBD network or device 100 may be a device, such as an access point (AP) or a base station (BS), operating in a master mode. The TVBD network or device 100, the AP, or the BS, operating in the master mode, may communicate with the CM 300 for coexistence and manage and/or control devices operating in a slave mode.

The CDIS 400, having an interface with respect to the CM 300, obtains information regarding the CM 300 served by the CDIS 400 and the CE 200 served by the corresponding CM 300, e.g., geo-location information of the TVBD network or device 100 served by the CE 200, available channel list information obtained by the TVBD network or device 100 from the TVWS database, measurement results of the TVBD network or device 100, a list of CEs 200 served by the CM 300, and the like, from the CM 300 and manages the obtained information.

The CDIS 400 may calculate a neighbor relationship between the CMs 300 served by the CDIS 400 and that between the CEs 200. Namely, based on a particular TVBD network or device 100, the CDIS 400 may calculate a certain TVBD network or device 100 which is in an interference relationship with the particular TVBD network or device 100 and a CE 200 and a CM 300 that serve the certain TVBD network or device 100.

In order to use the coexistence service, the CE 200 establishes a connection with the CM 300 and registers itself to the corresponding CM 300. In this case, the CM 300 should establish a connection with a neighboring CM 300. The CM 300 manages CEs 200 registered to the CM 300, and provides a service for coexistence. Such a topology in which the CM 300 manages a plurality of CEs 200 and makes a decision for coexistence is called a centralized topology. In the centralized topology, the CM 300 is a decision maker, so the CD 200 follows the decision made by the CM 300.

Hereinafter, each element of the coexistence system will be described in detail.

The CE 200 is connected to the CM 300 via an interface B1, the CM 300 is connected to the CDIS or CDB 400 via an interface B2, and the CM 300 is connected to another CM 200' via an interface B3.

Also, CE 200 is connected with the TVBD network or device 100 through an interface A. Here, the TVBD network or device 100 refers to a terminal that is able to use TV white space in the US Federal Communication Commission (FCC). The TVBD network or device 100 may be connected with the TVWS database 600 through an interface C.

The CE 200 may request information required for coexistence from the TVBD network or device 100 and obtain the corresponding information, and switch a reconfiguration switching request/command and control information received from the CM 300 to a TVBD-specific reconfiguration request/command and transmit the same to the TVBD network or device 100.

In order to solve the coexistence problem between TVBD networks, the CM 300 may have a function of discovering different CMs, a coexistence decision function of generating corresponding coexistence request/command and control information and providing the generated coexistence request/command and control information to the CE 200, and a function of supporting exchanging of information required for coexistence between CMs (this may include hierarchical and/or peer-to-peer decision making capabilities in disposing CMs).

Also, the CM 300 may have a function of selecting a representative CM by sharing information regarding CMs, a function of generating a coexistence whitespace map for effectively sharing frequency resources between different networks (to be described) and between different systems, and a function of assisting network operators in performing management in relation to TVWS coexistence.

The CM 300 may be implemented in an embedded form in a device such as an AP or a BS or may be implemented outside a device.

The CDIS/CDB 400 may be represented by a CMS or a COB according to functions. The CDIS/CB 400 may have a function of generating a coexistence whitespace map or a coexistence map in order to effectively share frequency resources between different networks and between different systems, a function of controlling a plurality of operators in performing management in relation to TVWS coexistence, and a function of electing a representative CM in order to reduce overhead between CMs and solve a coexistence problem.

Also, the CDIS/CDB 400 may perform a function of calculating a coexistence contour in order to search for neighboring networks and/or systems, a function of redirecting the coexistence whitespace map or the coexistence map according to the TVBD in order to solve the coexistence problem, a function of supporting searching for CMs by accelerating opening of an interface between CMs and a function of collecting, coordinating (i.e., synthesizing or generalizing), and providing information that may be able to promote coexistence (this function includes a data storing and data processing).

In allocating resources, the CDIS/CDB 400 may omnipotently distribute resources, present, as an intermediary, the reference of priority among the CMs 300 and fine-tune resource selection of the respective CMs 300, or act as an external and heterogeneous network medium for sharing information among the CMs 300.

Meanwhile, the interface A is an interface between the CE 200 and the TVBD network or device 100. Information required for coexistence, a request for configuration/information for coexistence, a configuration/measurement/information response for coexistence, and different information, as necessary, may be provided from the TVBD network or device 100, reconfiguration request/command and control information (which corresponds to coexistence request/command and control information received from a CM), a request/command in relation to controlling a measurement value performed by the TVBD network or device 100, information regarding available resource, and different information, as necessary, may be provided from the CD 200 to the TVBD network or device 100.

The interface B1 is an interface between the CE 200 and the CM 300. Information (information obtained from the TVBD network or device 100) required for coexistence and any other information, as necessary, may be provided from the CE 200 to the CM 300. Coexistence request/command and control information and any other information, as necessary, may be provided from the CM 300 to the CE 200.

The interface B2 is an interface between the CM 300 and the CDIS/CDB 400. Information required for a coexistence map, information required for a neighbor set, information required for registration or unenrollment, information required for searching (obtained by a currently used CM), information required for coexistence (obtained by the currently used CM), any other information as necessary, and the like, may be provided from the CM 300 to the CDIS/CDB 400.

From the CDIS/CDB 400 to the CM 300, information provided for coexistence map, information provided for a neighbor set (or a neighbor list), information provided for a representative CM, information required for searching (obtained by another CM), information required for coexistence (obtained by the different CM), and any other information as necessary, and the like, may be provided.

The interface B3 is an interface between the CM 300 and another CM 300'. From the CM 300 to another CM 300', information and a message required for searching and coexistence, information provided for registration/unregistration (from the CM to a representative CM or from a CM of a device to a CM of a server), information provided for a coexistence map (from the CM to a representative CM or from a CM of a server to a CM of a device), information required for policy exchange/negotiation, any other information as necessary, and the like, may be provided.

The interface C is an interface between the TVBD device 100 and the TVWS database 600. Information provided for an available channel may be provided from the TVWS database 600 to the TVBD network or device 100.

The interface D is an interface between the CM 300 and an operator management entity (OME) 700. Network operation information in relation to information (e.g., a limitation factor related to an operation of a spectrum policy/network) and any other information as necessary may be provided to the CM 300 through the interface D by the OME 700.

Figure 2:
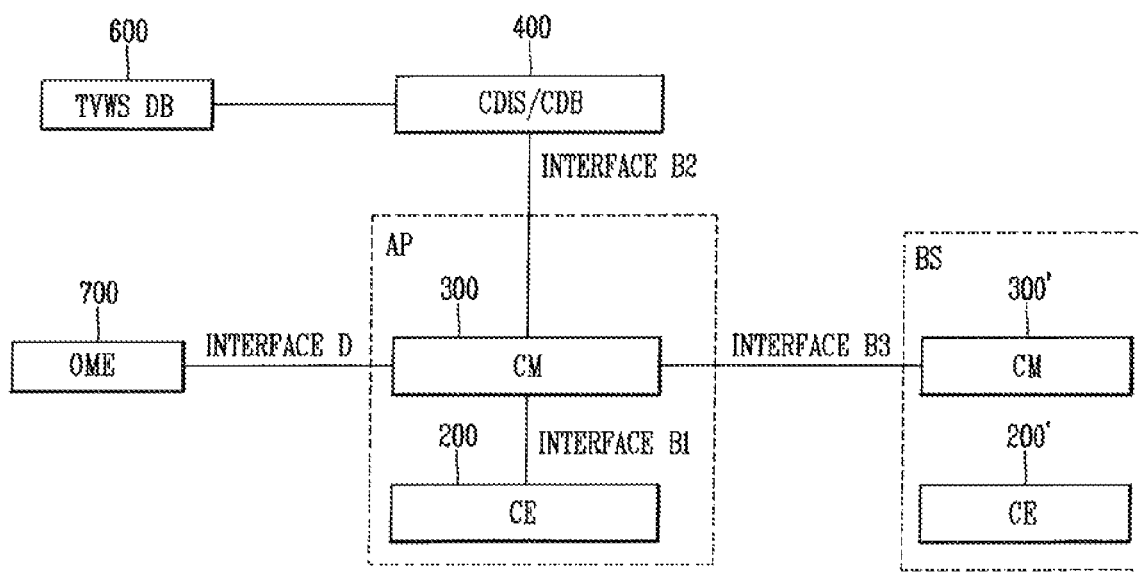
FIG. 2 is a schematic block diagram of a coexistence system according to another embodiment of the present disclosure.

FIG. 2 is a schematic block diagram showing a coexistence system according to another embodiment of the present disclosure.

As can be seen from FIG. 2, the CE 200 and the CM 300 may be embedded in an AP and a BS, respectively.

Also, the CDIS/CDB 400 may be connected to the TVWS database 600. Through this connection, the CDIS/CDB 400 may receive white space information from the TVWS database 600.

Figure 3:
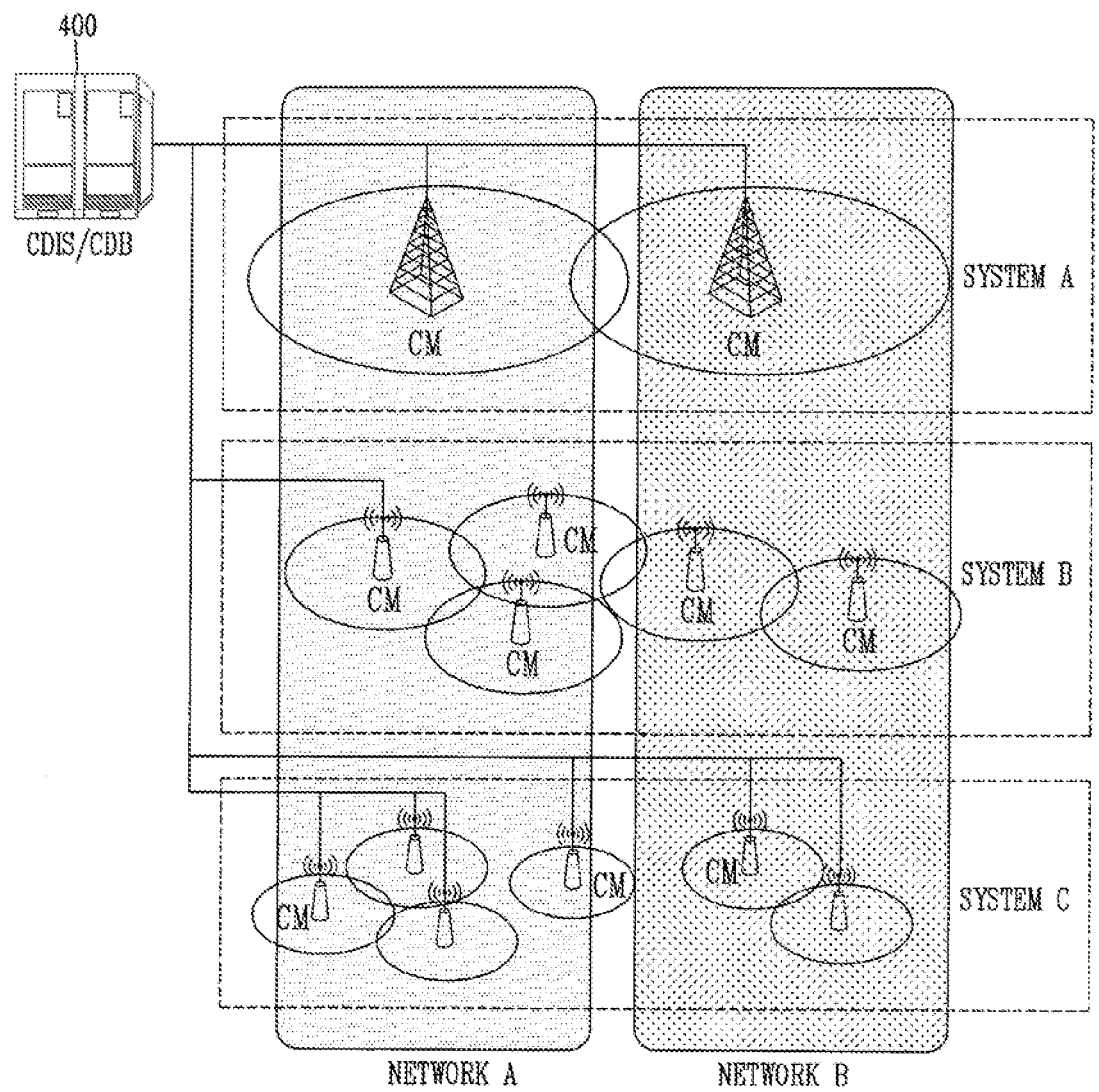
FIG. 3 is a view showing an example of a disposition of the coexistence system according to an embodiment of the present disclosure.

FIG. 3 is a view showing an example of a disposition of the coexistence system according to an embodiment of the present disclosure.

As can be seen from FIG. 3, a network A and a network B exist vertically. Also, a communication system A, a communication system B, and a communication system C exist horizontally. The communication system A, the communication system B, and the communication system C use different wireless access schemes, namely, communication schemes, respectively. For example, the communication system A may be a system such as CDMA, GSM, CDMA-2000, WCDMA, LTE, LTE-Advanced, or IEEE 802.16. The system B may be a cellular system whose cell coverage is smaller than that of the communication system A. Or, the system B may be a system such as Wi-Fi. The system C may be a cellular system, e.g., a femto-cell, whose cell coverage is smaller than that of the system B. The communication system A, the communication system B, and the communication system C has a coexistence manager (CM), respectively.

Meanwhile, the communication system A, the communication system B, and the communication system C geographically coexist within the network A and coexist within the network B. In order for the communication system A, the communication system B, and the communication system C to coexist, the CDIS/CDB 400 may generate a coexistence map and transmit the CM of each of the communication system A, the communication system B, and the communication system C.

Figure 4:
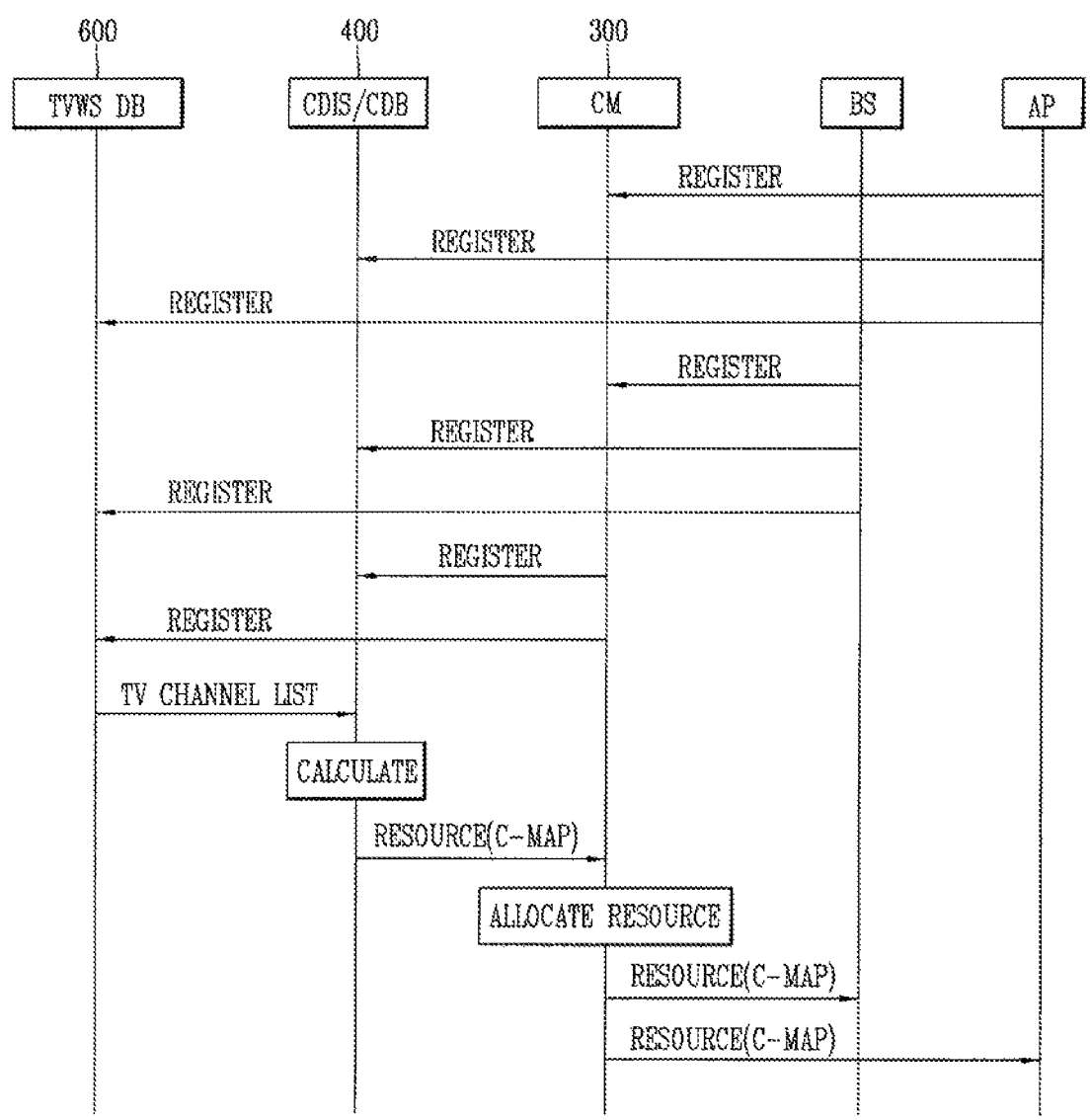
FIG. 4 shows an operation of the coexistence system according to an embodiment of the present disclosure.

FIG. 4 shows an operation of the coexistence system according to an embodiment of the present disclosure.

As can be seen from FIG. 4, it is illustrated that the CM 300 is not installed in an AP and a BS, but this is merely illustrative and the CM 300 may be installed in the AP and the BS. Also, the CE 200 may be installed in the AP and the BS.

Meanwhile, the AP and the BS are registered to the CM 300 and the CDIS/CDB 400, respectively.

The CM also performs registration to the CDIS/CDB 400 and the TVWS database.

Meanwhile, the CDIS/CDB 400 may receive a channel list for a broadcast from the TVWS database 600. The channel list may be frequency information for a broadcast. Also, the channel list may include information regarding an operating channel of a broadcast and a transmit power limitation.

The CDIS/CDB 400 checks whether or not the BS and the AP coexist within a certain area by using location information of the BS and the AP and an available channel information. When the BS and the AP coexist, the CDIS/CDB 400 may calculate a coverage radius of the AP and the BS, allocate channels (or resources) or one or more frequency bands that may be used by the different types of access points, namely, the AP and the BS, located in the certain area based on the channel list, namely, the frequency information for a broadcast, generate the channels (or resources) or information regarding the bands, e.g., a coexistence map, and transmit the same.

Figure 5:
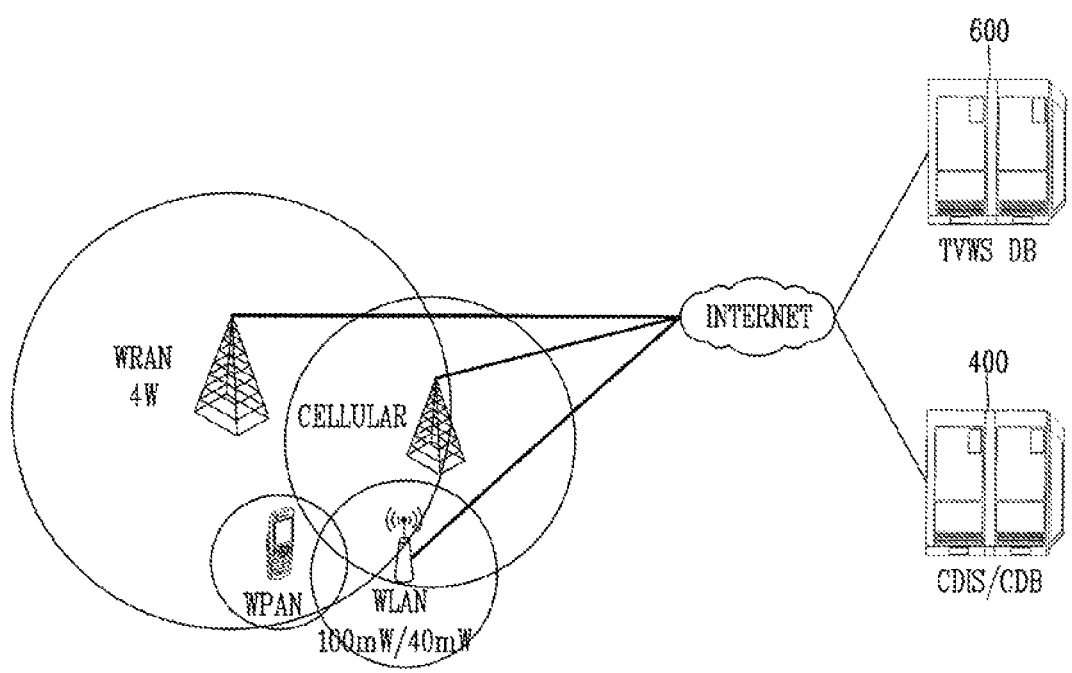
FIG. 5 is a view showing another example of a disposition of the coexistence system according to an embodiment of the present disclosure.

FIG. 5 is a view showing another example of a disposition of the coexistence system according to an embodiment of the present disclosure.

As can be seen from FIG. 5, the CM or the CDIS/CDB 400 may coordinate to allow several APs to coexist in the wireless environment. The several APs may be connected to the CDIS/CDB 400 by using a physical connection such as the Internet.

The CDIS/CDB 400 may obtain channel information for a broadcast from the TVWS database 600 as mentioned above Also, the CDIS/CDB 400 may obtain channel information, e.g., a broadcast channel set, for a broadcast in a particular geographical area. Also, the CDIS/CDB 400 may calculate a coexistence contour. In particular, the CDIS/CDB 400 may have a neighbor detection function in different systems operating at the TV broadcast white space or a TV broadcast frequency.

Also, as mentioned above, the CDIS/CDB 400 may generate a coexistence white space map or a coexistence map. Also, the CDIS/CDB 400 may provide common clock information. Also, the CDIS/CDB 400 may provide information for time synchronization between different systems.

The CDIS/CDB 400 may provide a parameter with respect to a radio range and an interference range of each device. The CDIS/CDB 400 may provide a parameter with respect to the foregoing coexistence contour. The CDIS/CDB 400 may identify neighbor network devices for the purpose of coexistence between different systems. The CDIS/CDB 400 may provide information regarding transmission power of each network, an antenna height, and any other physical parameters.

Figure 6A:
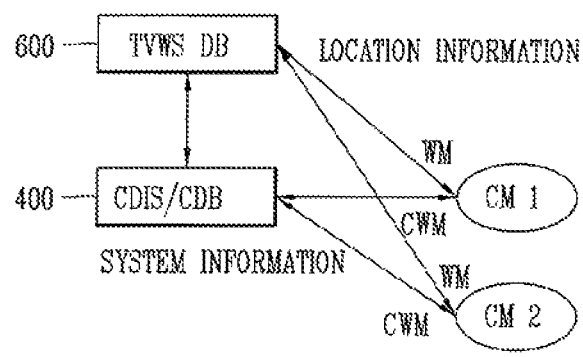
FIGS. 6A and 6B are views showing an operation of a CDIS/CDB 400.
Figure 6B:
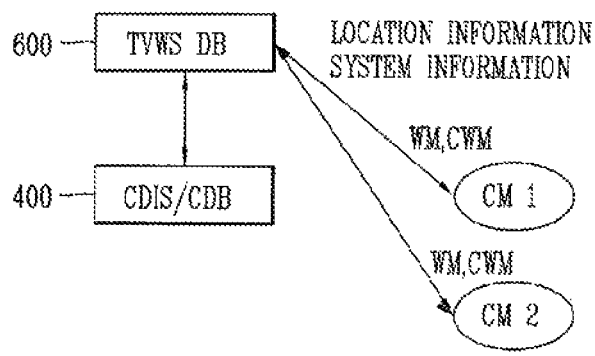

FIGS. 6A and 6B are views showing an operation of a CDIS/CDB 400.

As can be seen from FIG. 6A, a first CM CM1 and a second CM CM2 exist. The first. CM CM1 and the second CM CM2 are connected to the TVWS DB 600 and the CDIS/CDB 400, respectively. The first CM CM1 and the second CM CM2 receive location information and frequency information for a broadcast, e.g., information regarding a whitespace map, from the TVWS DB 600. The whitespace map may refer to information regarding an empty frequency band not used by a broadcast service provider in VHF and UHF frequency bands distributed as TV broadcast bands.

Meanwhile, the CDIS/CDB 400 may be connected to the TVWS DB 600 and receive the frequency information for a broadcast, e.g., the whitespace map, from the TVWS DB 600. As mentioned above, the CDIS/CDB 400 may generate a coexistence whitespace map or a coexistence map based on the frequency information for a broadcast, e.g., the whitespace map. The CDIS/CDB 400 may transfer the generated coexistence whitespace map (CWM) or the coexistence map to the first CM CM1 and the second CM CM2.

Meanwhile, as can be seen from FIG. 6B, the first CM CM1 and the second CM CM2 are connected to the TVWS DB 600. The TVWS DB 600 may be connected to the CDIS/CDB 400.

The CDIS/CDB 400 may transfer the foregoing CWM or the coexistence map to the TVWS DB 600, and the TVWS DB 600 may transfer the received CWM or the coexistence map to the first CM CM1 and the second CM CM2. In this case, the TVWS DB 600 may transfer the received CWM or the coexistence map under the assumption that it is frequency information for a broadcast, e.g., the whitespace map.

Alternatively, the TVWS DB 600 may transfer the frequency information a broadcast, e.g., the whitespace map, as well as the received CWM or the coexistence map, to the first CM CM1 and the second CM CM2. In this case, when the first CM CM1 and the second CM CM2 receive the CWM, the coexistence map, and the frequency information for a broadcast, e.g., the whitespace map, the first CM CM1 and the second CM CM2 may select and use appropriate one or more of them.

Figure 7:
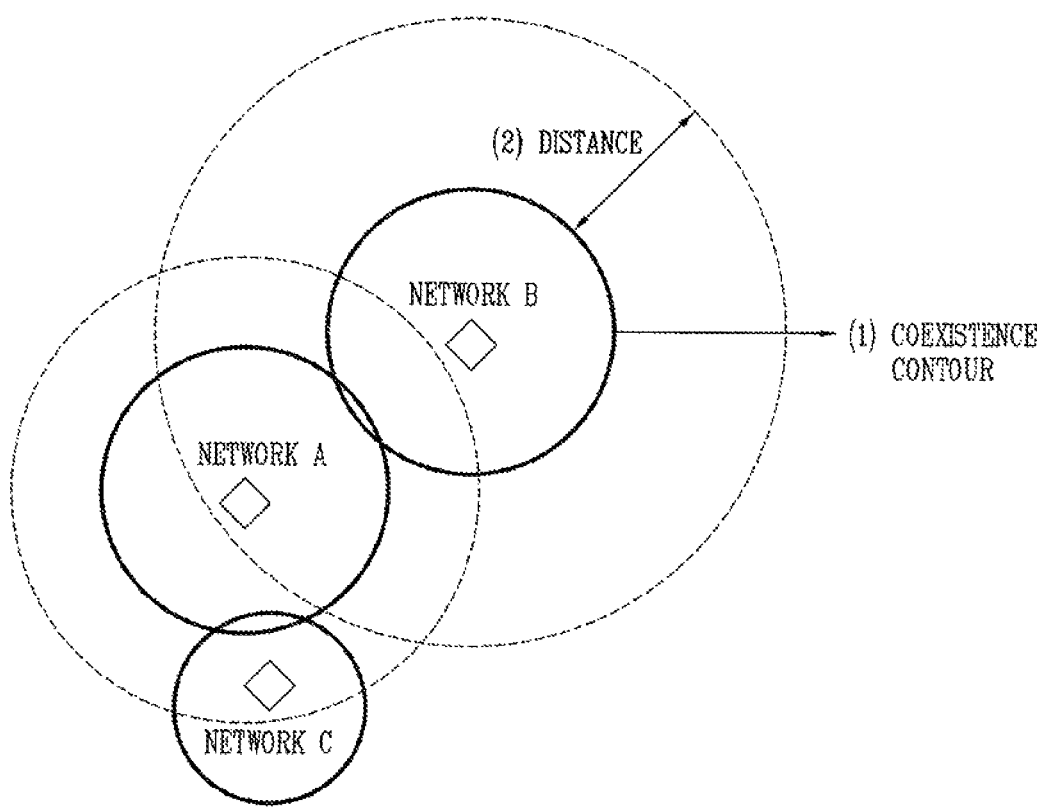
FIG. 7 is a view showing coexistence contours.

FIG. 7 is a view showing coexistence contours.

As can be seen from FIG. 7, the network A, the network B, and the network C exist in proximity. Coexistence contours of the respective networks are illustrated by solid lines and distances between the respective networks are illustrated by dotted lines. The coexistence contours are determined by the characteristics of the respective networks. Meanwhile, the distance between the respective networks may be determined by characteristics with different networks. As can be seen from FIG. 8, the coexistence contours between the network A and the network B are almost in contact, and the coexistence contours between the network A and the network C overlap with each other.

Figure 8:
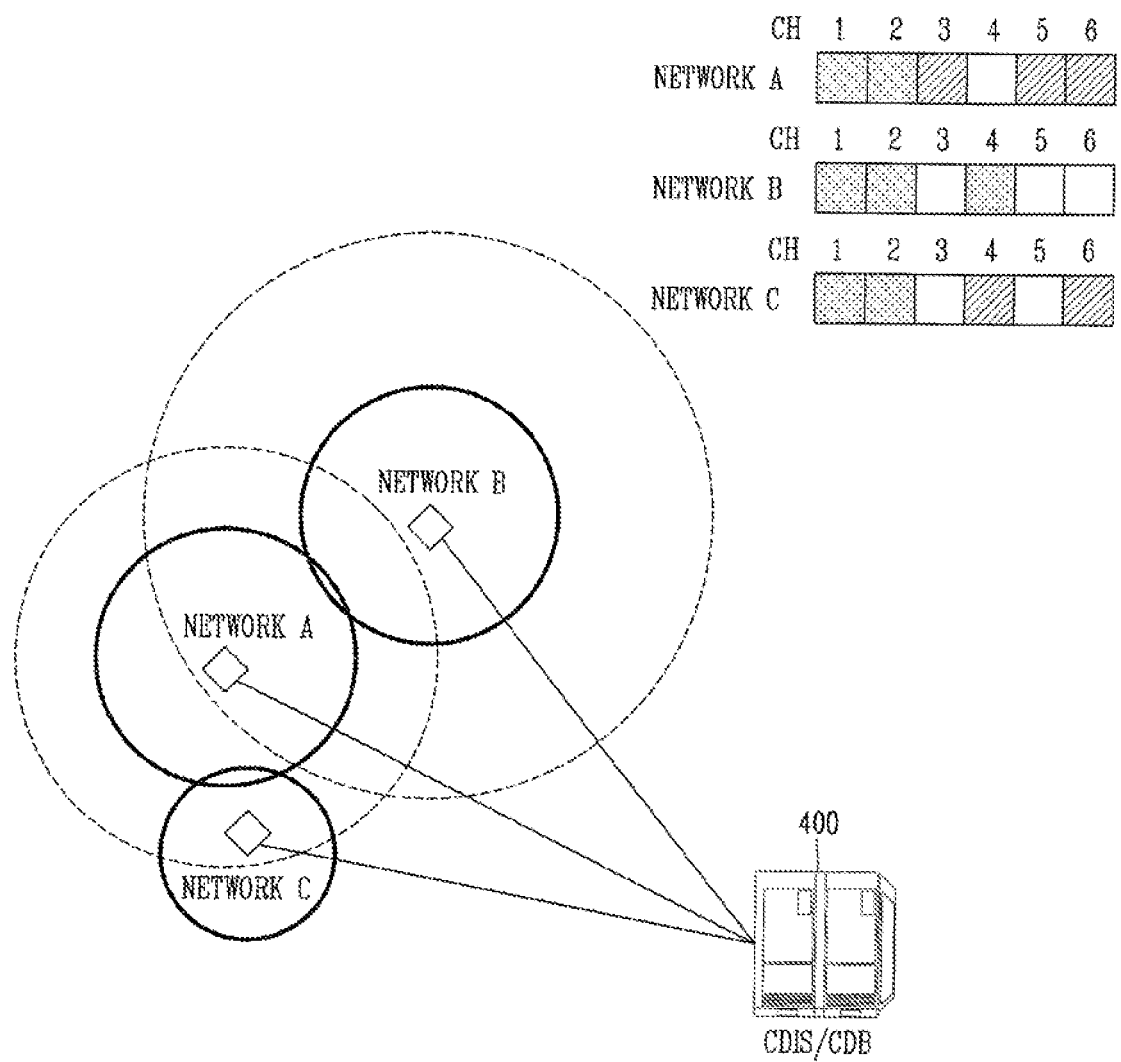
FIG. 8 is a view showing an example of a coexistence whitespace map (CWM) or a coexistence map in the environment of FIG. 7.

FIG. 8 is a view showing an example of a coexistence whitespace map (CWM) or a coexistence map in the environment of FIG. 7.

As shown in a right upper portion of FIG. 8 it is assumed that channels 1 to 6 exist. In this case, it is assumed that channels 1 and 2 are channels used for a broadcast according to the frequency information for a broadcast, e.g., the whitespace map.

The CDIS/CDB 400 transmits the CWM or the coexistence map indicating that the channel 4 is an idle channel to the network A. Accordingly, when the network A determines to use the channel 4, the CDIS/CDB 400 transmits the CWM or the coexistence map indicating that the channel 3, the channel 5, and the channel 6 are idle channels to the network B. Accordingly, when the network B determines to use, for example, the channel 6, the CDIS/CDB 400 may transmit the CWM or the coexistence map indicating that the channel 3 and the channel 5 are idle channels to the network C.

In this manner, the CDIS/CDB 400 transmits the CWM or the coexistence map to the networks A, B, and C, to thus allow the networks A, B, and C to coexist in the wireless environment.

Figure 9:
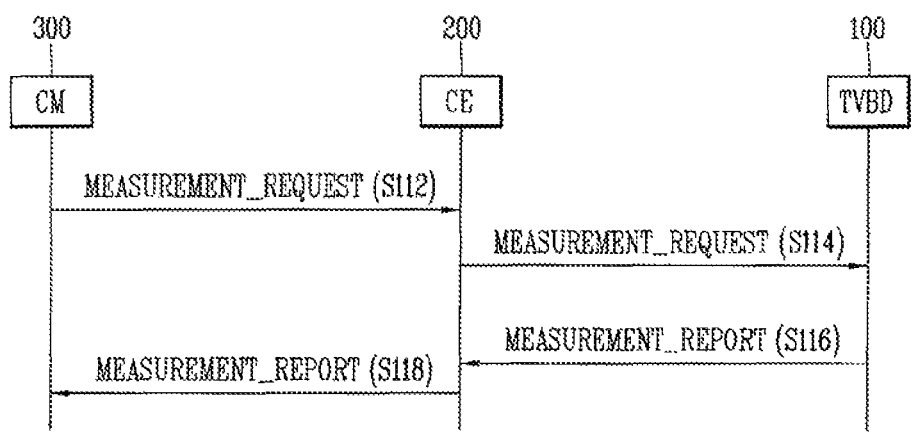
FIG. 9 is a flow chart illustrating a process for receiving occupied channel information and interference level information from the TVBD network or device by the CM according to an embodiment of the present disclosure.

FIG. 9 is a flow chart illustrating a process for receiving occupied channel information and interference level information from the TVBD network or device 100 by the CM 300 according to an embodiment of the present disclosure.

The TVBD network or device 100 may transmit the occupied channel information and interference level information to the CM 300 through a measurement message. In this case, the TVBD network or device 100 may transmit a measurement frame format to the CM 300 according to a request from the CM 300.

Namely, the CM 300 transmits a measurement request (measurement_request) to the CE 200 (step S112), and the CE 200 transmits the received measurement request to the TVBD network or device 100 (step S114). Also, in response to the measurement request, the TVBD network or device 100 transmits a measurement report to the CE 200 (step S116), and the CE 200 transmits the received measurement report to the CM 300 (step S118).

Figure 10:
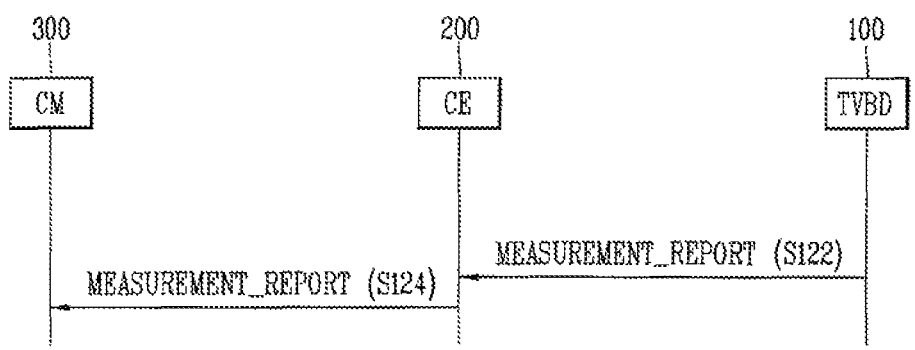
FIG. 10 is a flow chart illustrating a process for receiving occupied channel information and interference level information from the TVBD network or device by the CM according to another embodiment of the present disclosure.

FIG. 10 is a flow chart illustrating a process for receiving occupied channel information and interference level information from the TVBD network or device 100 by the CM 300 according to another embodiment of the present disclosure.

Meanwhile the TVBD network or device 100 may periodically transmit a measurement frame format to the CM 300. Namely, the TVBD network or device 100 periodically transmits the measurement report to the CE 200 (step S122), and the CE 200 transmits the received measurement report to the CM 300 (step S124).

The measurement report frame format may be defined as shown in Table 1 below.

TABLE 1

| Information Element | Coexistence frame header | Information type | Measurement report elements |
|---|---|---|---|
| octet | 8 | 1 | Variable |

The coexistence frame header identifies a frame. The value of the information type field may be set to be 3 (measurement request). The measurement request elements field may include one or more measurement request elements. In a single measurement request frame, the number and length of the measurement request elements may be limited by the size of a maximum allowed coexistence protocol data unit (CX-PDU). The measurement request elements may include a request for performing a designated measurement operation of the TVBD network or device 100 that receives the measurement request.

The measurement request element frame format may be defined as shown in Table 2 below.

TABLE 2

| Information element | Length | Measurement type | Measurement request |
|---|---|---|---|
| Octet | 1 | 1 | Variable |

The measurement type field may be defined as shown in Table 3 below.

TABLE 3

| Measurement type | Description |
|---|---|
| 0 | Reserved |
| 1 | Interference Level |
| 2 | Occupied Channel Information |
| 3-7 | Reserved |

In the measurement request element, the measurement type may indicate an interference level. The measurement request field corresponding to the interference level request element may be defined as shown in Table 4 below.

TABLE 4

| Information element | Measurement Start Time | Measurement Duration | TV channel numbers |
|---|---|---|---|
| Octet | 2 | 1 | Variable |

The measurement start time field is set to be a time at which a requested measurement starts. The value 0 indicates that the requested measurement immediately starts. The measurement duration field may be set as a duration time of the requested measurement expressed by time units (TUs). The TV channel numbers indicate TV channel numbers to which the measurement request is applied. The channel numbers may be determined to be different in each country or area.

The measurement report frame format may be defined as shown in Table 5 below.

TABLE 5

| Information element | Coexistence frame header | Information type | Measurement report elements |
|---|---|---|---|
| Octet | 8 | 1 | Variable |

The coexistence frame header identifier a frame. A value of the information type field of a measurement report may be set to be, for example, 4. The measurement report elements field may include one or more measurement report elements. The number and length of the measurement report elements in a single measurement report frame may be limited by a maximum allowed CXPDU size.

The measurement report elements frame format may be defined by Table 6 shown below.

TABLE 6

| Information element | Length | Measurement type | Measurement report |
|---|---|---|---|
| Octet | 1 | 1 | Variable |

The measurement type field may be defined as shown in Table 3 above. In the measurement report element, the measurement type may indicate an interference level. The measurement report field corresponding to the interference level report element may be defined as shown in Table 7 below.

TABLE 7

| Information element | Actual Measurement Start Time | Measurement Duration | Measuring TVBD Address | Interference Level Report |
|---|---|---|---|---|
| Octet | 8 | 2 | 6 | Variable |

The actual measurement start time field is set as a time at which a TVBD measurement starts. The measurement duration field is set as a duration time in which a TVBD report expressed by time units (TUs) is measured. The measuring TVBD address field is set as a MAC address of the TVBD network or device 100 that has actually performed measurement. The interference level report field may be periodically repeated. The interference level report field may indicate the detected TVBD network or device 100.

The measurement type in the measurement report element may indicate occupied channel information. The measurement report field corresponding to the occupied channel information may be defined as shown in Table 8 below.

TABLE 8

| Information element | Actual Measurement Start Time | Measurement Duration | Measuring TVBD Address | Occupied Channel Information Report |
|---|---|---|---|---|
| Octet | 8 | 2 | 6 | Variable |

The occupied channel information report may be defined as shown in Table 9 below.

TABLE 9

| Device Type | Description |
|---|---|
| 0 | Reserved |
| 1 | Channel Number |
| 2 | Power |
| 3-7 | Reserved |

The actual measurement start time field may be set as a time at which a TVBD measurement starts. The measurement duration field may be set as a duration time in which the TVBD report expressed by time units (TUs) is measured. The channel number may be set as a channel number used by the TVBD user.

Figure 11:
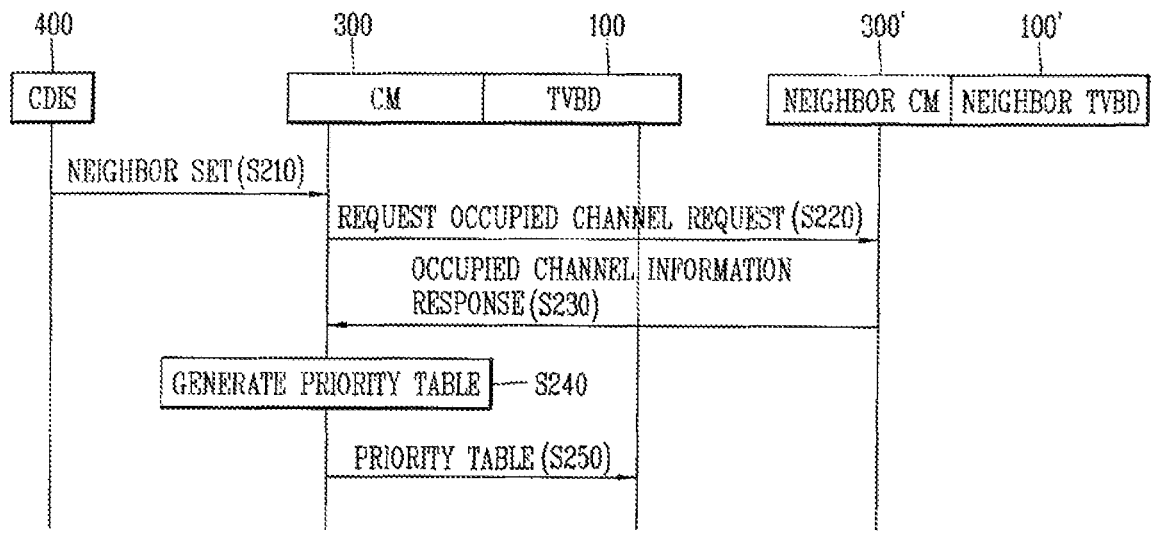
FIG. 11 is a flow chart illustrating a process of discovering a neighbor set of the TVBD network or device 100 by the CM 300 according to an embodiment of the present disclosure.

FIG. 11 is a flow chart illustrating a process of discovering a neighbor set of the TVBD network or device 100 by the CM 300 according to an embodiment of the present disclosure.

First, the CDIS 400 may receive neighbor information, timing information, resource information, an interference level, and the like, from the TVBD network or device 100 or the CM 300, calculate a neighbor set, and transfers the calculated neighbor set to the CM 300 (step S210).

The CM 300 transmits a request for occupied channel information of the neighbor TVBD network or device 100' including the neighbor set to the neighbor CM 300' (step S220). The CM 300 receives the occupied channel information of the neighbor TVBD network or device 100' from the neighbor CM 300' (step S230).

The CM 300 compares an available channel of the TVBD network or device 100 and the occupied channel of the neighbor TVBD network or device 100'. And then, the CM 300 checks a channel included in the occupied channel of the neighbor TVBD network or device 100' among channels included in the available channels of the TVBD network or device 100 (overlap channel(s) is/are calculated). The CM 300 generates a channel table (or a priority table) in which a channel included in occupied channels of the neighbor TVBD network or device 100' and a channel not included in the occupied channels of the neighbor TVBD network or device 100', among channels included in available channels of the TVBD network or device 100, have different priority levels (step S240).

Here, among the channels included in the available channels of the TVBD network or device 100, a channel included in the occupied channel of the neighbor TVBD network or device 100' may have a priority level lower than that, of a channel not included in the occupied channel of the neighbor TVBD network or device 100'. The channel table (or priority table) may be divided into a table based on occupied channel information and a table based on the number of TVBD networks or devices 100 served by each CM 300. Alternatively, a table incorporating (or merging) the two types of tables may be configured.

The CM 300 transfers the generated channel table (or the priority table) to the TVBD network or device 100 (step S250).

A neighbor discovery information frame format that may be used in the process of discovering a neighbor set may be defined as shown in Table 10 below.

TABLE 10

| Information element | Coexistence frame header | Information type | Neighbor discovery information |
|---|---|---|---|
| Octet | 8 | 1 | Variable |

The coexistence frame header identifies a frame. The information type field may be set to be, for example, 3 (measurement request). The neighbor discovery information elements include one or more neighbor discovery information elements. In a single neighbor discovery information frame the number and length of the neighbor discovery information elements are limited by the size of a maximum allowed CXPDU.

The neighbor discovery information element format may be defined as shown in Table 11 below.

TABLE 11

| Information element | Length | Neighbor discovery information Table | Neighbor discovery information request |
|---|---|---|---|
| Octet | 1 | 1 | Variable |

Neighbor discovery information field may be defined as shown in Table 12 below.

TABLE 12

| Measurement Type | Description |
|---|---|
| 0 | Reserved |
| 1 | Neighbor discovery information |
| 2-7 | Reserved |

The neighbor discovery information table element may indicate occupied channel information. The neighbor discovery information corresponding to the neighbor discovery information request element may be defined as shown in Table 13 below.

TABLE 13

| Information element | Occupied TV channel | TV channel numbers |
|---|---|---|
| Octet | 2 | variable |

The TV channel numbers indicate TV channel numbers to which the neighbor discovery information request is applied. Channel numbers are defined to be different in each country or area.

The neighbor discovery information request element may indicate occupied channel information of the CM 300 for the neighbor TVBD network or device 100). The neighbor discovery request element field corresponding to the neighbor discovery information request element may be defined as shown in Table 14 below.

TABLE 14

| Information element | Neighbor CM ID | Occupied TV channel |
|---|---|---|
| Octet | 2 | 2 |

Figure 12:
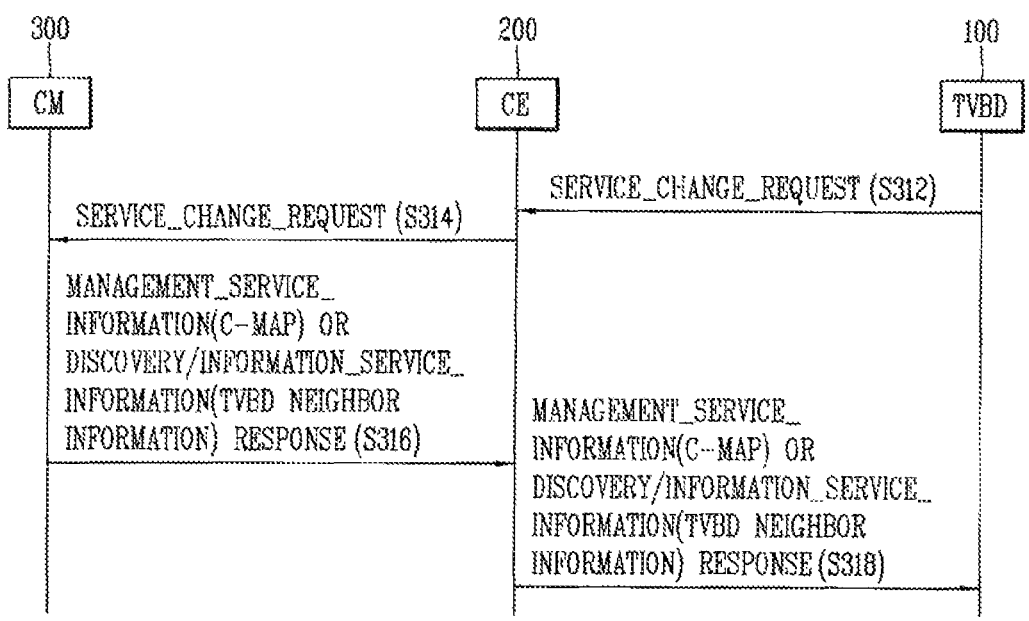
FIG. 12 is a flow chart illustrating a process of switching a service by the TVBD network of device 100 or the CM 300 according to an embodiment of the present disclosure.

FIG. 12 is a flow chart illustrating a process of switching a service by the TVBD network of device 100 or the CM 300 according to an embodiment of the present disclosure.

In the coexistence system, two types of services may be provided. A first service (management service) may be a service in which the CM 300 determines an available channel of the TVBD network or device 100 on the basis of various types of information such as neighbor information, timing information, resource information, interference level information, and the like, and transfers the determined available channel information to the TVBD network or device 100 and manages the same.

A second service (discovery/information service) may be a service in which the TVBD network or device 100 receives a neighbor set from the CIDS 400, receives an available channel list from the TVWS DB 600, and determines an available channel. Switchover between the first and second services may be made by the TVBD network or device 100 or the CM 300. Also, the TVBD network or device 100 may receive service information from the CM 300 and select any one of the first and second services as a service of the coexistence system on the basis of the received service information.

The TVBD network or device 100 may determine whether to switch a service on the basis of the available channel information received from the CM 300. When there is no available channel which is required (e.g., when a channel having a sufficient size cannot be secured although a plurality of adjacent channels are merged), the TVBD network or device 100 may determine switching from the first service to the second service. In this case, the TVBD network or device 100 transfers a service changing request to the CE 200 (step S312), and the CE 200 transmits the service changing request to the CM 300 (step S314). In response to the service changing request, the CM 300 transmits first service information (C-MAP) or second service information (TVBD neighbor information) to the CE 200 (step S316), and the CE 200 transfers the received service information to the TVBD network or device 100 (step S318).

Figure 13:
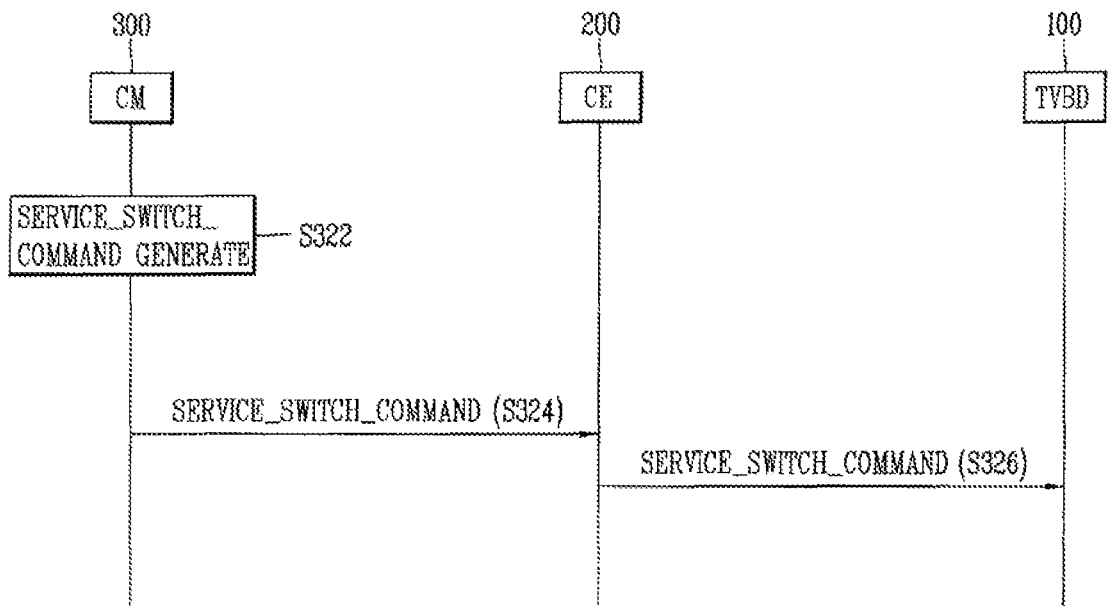
FIG. 13 is a flow chart illustrating a process of switching a service by the TVBD network of device 100 or the CM 300 according to another embodiment of the present disclosure.

FIG. 13 is a flow chart illustrating a process of switching a service by the TVBD network of device 100 or the CM 300 according to another embodiment of the present disclosure.

The CM 300 generates a service switch command (Service_switch_command) on the basis of various types of information such as neighbor information, timing information, resource information, interference level information, and the like, received from the CDIS/CDB 400 and the TVBD network or device 100 (step S322) and transmits the generated service changing command to the CE 200 (step S324) The CE 200 transfers the received service changing command to the TVBD network or device 100 (step S326).

The service changing request frame format may be defined as shown in Table 15 below.

TABLE 15

| Information element | Coexistence header | Information Type | Dialog Token | Service changing request element |
|---|---|---|---|---|
| Octet | 8 | 1 | | Variable |

The coexistence header identifies a frame. The information type field may be set to be 9 (Service changing request frame) indicating a service changing request frame. The service changing request element format may be defined as shown in Table 16 below.

TABLE 16

| Information element | Length | Command Type | Command request |
|---|---|---|---|
| Octet | 1 | 1 | Variable |

The command type field is defined as shown in Table 17 below.

TABLE 17

| Command Type | Description |
|---|---|
| 0 | Reserved |
| 1 | Service Changing |
| 2-7 | Reserved |

In the service changing command request element, the command type may indicate service switching. The service changing request field corresponding to the service changing command request element may be defined as shown in Table 18 below.

TABLE 18

| Information element | TVBD Address/CM ID | Service Type |
|---|---|---|
| Octet | 6 | variable |

Length is a variable value subject to the length value of the service type field.

The service changing response frame format may be defined as shown in Table 19 below.

TABLE 19

| Information element | Coexistence header | Information Type | Dialog Token | Service changing response element |
|---|---|---|---|---|
| Octet | 8 | 1 | | Variable |

The coexistence header identifies a frame. The information type field is set to be 10 (service changing response frame) indicating a service changing response frame. The service changing response element format is defined as shown in Table 20 below.

TABLE 20

| Information element | Length | Command Type | Command response |
|---|---|---|---|
| Octet | 1 | 1 | Variable |

The command type field is defined as shown in Table 18 above.

In the service changing command response element, the command type may indicate service switching. The service changing response field corresponding to the service changing command response element may be defined as shown in Table 21 below>

TABLE 21

| Information element | Status Code |
|---|---|
| Octet | 1 |

The status code field indicates success or failure of a requested operation. A length of the status code field may be 1. An allocated status code may be defined as shown in Table 22 below.

TABLE 22

| Measurement Type | Description |
|---|---|
| 0 | Reserved |
| 1 | Reserved |
| 2 | Success |
| 3 | Unspecified failure |
| 4-255 | Reserved |

Figure 14:
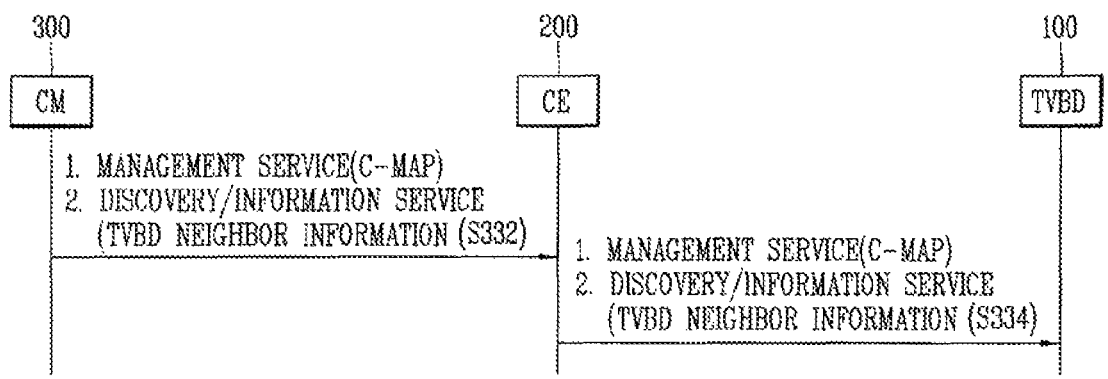
FIG. 14 is a flow chart illustrating a process of selecting a service by the TVBD network of device 100 according to another embodiment of the present disclosure.

FIG. 14 is a flow chart illustrating process of selecting a service by the TVBD network of device 100 according to another embodiment of the present disclosure.

The CM 300 transmits a C-MAP (Coexistence MAP) for a first service and neighbor information for a second service to the CE 200 (step S332), and the CE 200 transfers the received neighbor information to the TVBD network of device 100 (step S334). The TVBD network of device 100 selects a service on the basis of the received neighbor information.

The service switching frame format is defined as shown in Table 29 below.

TABLE 23

| Information element | Coexistence frame header | Information type | Service switching request elements |
|---|---|---|---|
| Octet | 8 | 1 | Variable |

The coexistence frame header identifies a frame. A value of the information type field is set to be 3 (Service switching request). The service switching request elements field may include one or more service switching request elements. In a single measurement request frame, the number and a length of the service switching request elements may be limited by the size of a maximum allowed CXPDU. The service switching request element may include a request for performing a designated service switching operation of the TVBD network or device 100 that receives, the service switching request.

The service switching request element format may be defined as shown in Table 24 below.

TABLE 24

| Information element | Length | Service type | Service switching request |
|---|---|---|---|
| Octet | 1 | 1 | Variable |

The service type field may be defined as shown in Table 25 below.

TABLE 25

| Measurement Type | Description |
|---|---|
| 0 | Reserved |
| 1 | Service switching |
| 2-7 | Reserved |

The service type field may be defined as shown in Table 26 below.

TABLE 26

| Information element | Management Service information | Discovery/Information Service information |
|---|---|---|
| Octet | 2 | 2 |

The management service sub-element field may be defined as shown in Table 27 below.

TABLE 27

| Information element | Sub-element ID | Length | Received Power | Available Channel Numbers |
|---|---|---|---|---|
| Octet | 1 | 1 | 1 | Variable |

The discovery/information service sub-element field may be defined as shown in Table 28 below.

TABLE 28

| Information element | Sub-element ID | Length | CM ID | Neighbor TVBD information |
|---|---|---|---|---|
| Octet | 1 | 1 | 1 | Variable |

The service switching request element field may be defined as shown in Table 29 below.

TABLE 29

| Information element | Service Type | Service Changing command |
|---|---|---|
| Octet | 2 | 2 |

FIG. 15A is a view showing semantics of a service primitive of a coexistence service changing request according to an embodiment of the present disclosure.

COEX_Servicechanging.request is used by a COEX user in order to change a service type. Parameters of the COEX_Servicechanging.request are defined as shown in Table 30 below.

TABLE 30

| Name | Data type | Description |
|---|---|---|
| DestinationIdentifier | COEX_ID | It identifies a local COEX entity or a remote COEX entity as destination of the request. |
| ServiceType | SERVICETYPE_ID | Service type |

COEX_Servicechanging.request is generated by the COEX user in order to change a service type. If a destination of the request is a local COEX entity itself, the local coexistence (COEX) entity responds by COEX_Servicechanging.confirm. If the destination of the request is a remote COEX entity, the local COEX entity may generate a Servicechanging Request message corresponding to the remote COEX entity.

FIG. 15B is a view showing semantics of a service primitive of a coexistence service change notification according to an embodiment of the present disclosure.

COEX_Servicechanging.indication is used by a COEX entity in order to notify the COEX user on a reception of a service switching report (Servicechanging Request) message from a peer COEX entity. A parameter of COEX_Servicechanging.indication is defined as shown in Table 31 below.

TABLE 31

| Name | Data type | Description |
|---|---|---|
| SourceIdentifier | COEX_ID | It identifies an invoker of a primitive which may be a local COEX entity or a remote COEX entity. |
| ServiceType | SERVICETYPE_ID | Service type |

The parameter of COEX_Servicechanging.indication is used by the COEX entity in order to notify the COEX user on a reception of a COEX_Servicechanging.request message when the COEX_Servicechanging.request message is received. When the indication is received, the COEX user responds by a COEX_servicechanging.reponse primitive.

FIG. 15C is a view showing semantics of a service primitive of a coexistence service changing response according to an embodiment of the present disclosure.

The COEX_Servicechanging.response is used by the COEX user in order to convey local service changing information (servicechanging information) to the COEX user who has invoked the service changing request (servicechanging request). The parameter of COEX_Servicechanging.response is defined as shown in Table 32 below.

TABLE 32

| Name | Data type | Description |
| --- | --- | --- |
| DestinationIdentifier | COEX_ID | It identifies remote COEX entity as destination of this response. |
| ResultCode | Enumeration | It reports the outcome of a request. |

The parameter of COEX_Servicechanging.response is used by the COEX user in response to the received COEX_Servicechanging.indication. When the response is received, the COEX entity may generate a corresponding COEX_servicechanging.report message and send the generated COEX_servicechanging.report message to a destination COEX entity.

FIG. 15D is a view showing semantics of a service primitive of a coexistence service change confirmation according to an embodiment of the present disclosure.

COEX_Servicechanging.confirm is used by the COEX entity in order to convey service changing information (servicechanging information) to the COEX user who has invoked the service changing request (Servicechanging request). A parameter of COEX_Servicechanging.confirm is defined as shown in Table 33 below.

TABLE 33

| Name | Data type | Description |
| --- | --- | --- |
| SourceIdentifier | COEX_ID | It identifies an invoker of this primitive that may be a local COEX entity or a remote COEX entity. |
| ResultCode | Enumeration | It reports the outcome of a request. |

The parameter of COEX_Servicechanging.confirm is invoked by the local COEX entity in order to convey the results of COEX_Servicechanging.request primitive from a previous COEX user. When the COEX user receives this primitive, it makes an appropriate decision and takes suitable actions. However, when ResultsCode does not indicate "Success", the recipient performs appropriate error handling.

Figure 16:
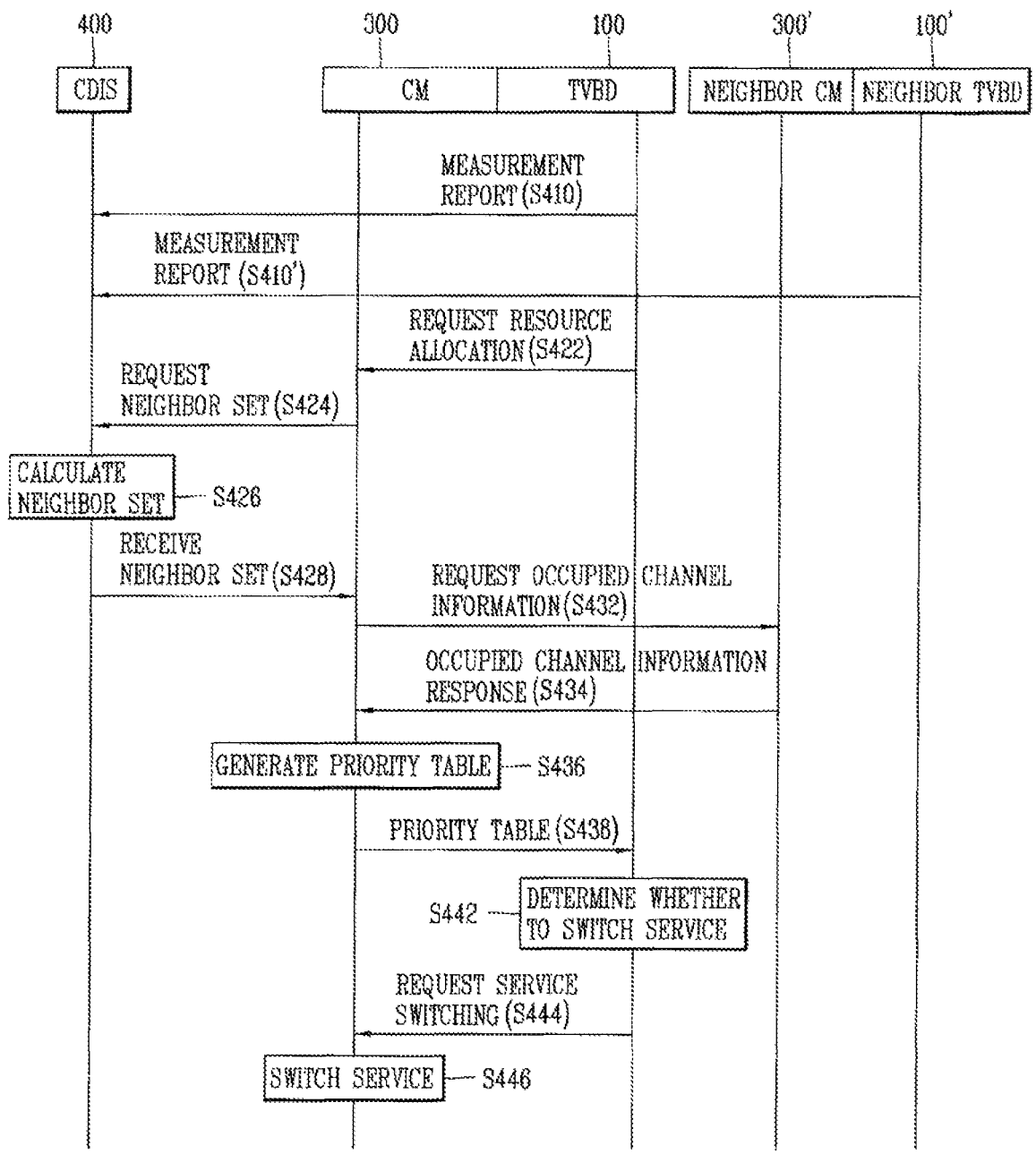
FIG. 16 is a flow chart illustrating a process of switching a service by the CM 300 according to embodiments of the present invention.

FIG. 16 is a flow chart illustrating a process of switching a service by the CM 300 according to embodiments of the present invention.

First, the TVBD network or device 100 or the neighbor TVBD network or device 100' is registered to the CM 300 and the CDIS/CDB 400. Also, the CM 300 and the neighbor CM 300' are registered to the CDIS/CDB 400.

As mentioned above, the TVBD network or device 100 registered to the CM 300 and the CDIS/CDB 400 transmits a measurement report periodically or according to a request from the CM 300 (step S410). Also, as mentioned above, the neighbor CM 300' and the neighbor TVBD network or device 100' transmit a measurement report to the CMS 400 according to a request from the neighbor CM 300' (step S410').

The measurement report may include occupied channel information and interference level information of the TVBD network or device 100. The reason for the measurement report to include the interference level information of the TVBD network or device 100 is to accurately calculate a neighbor set in comparison to the case in which the existing CDIS/CDB 400 calculates a neighbor set by using only occupied channel information of the TVBD network or device 100.

When a resource allocation is requested, the TVBD network or device 100 may request resource allocation from the CM 300 (step S422). In this case, the TVBD network or device 100 may receive available channel information from the TVWS database 600 and transmit the same to the CM 300. When the request for a resource allocation is received from the TVBD network or device 100, the CM 300 requests a neighbor set from the CDIS/CDB 400 (step S424).

Here, the neighbor set may include information regarding a neighbor TVBD network or device 100' of the TVBD network or device 100 and information regarding a neighbor CM 300' serving the neighbor TVBD network or device 100'. The CDIS/CDB 400 may calculate a neighbor set on the basis of geographical location information (or geographical location information and the available channel information) of the TVBD networks or devices 100 registered to the CDIS/CDB 400 (step S426). The CM 300 may receive the calculated neighbor set from the CDIS/CDB 400 (step S428).

On the basis of the neighbor set, the CM 300 may request occupied channel information of the neighbor TVBD network or device 100' from the neighbor CM 300' (step S432). In this case, the CM 300 may transmit information regarding a neighbor TVBD network or device 100' of the TVBD network or device 100 to the CM 300.

On the basis of the measurement report received from the neighbor TVBD network or device 100', the neighbor CM 300' may transmit occupied channel information of the neighbor TVBD network or device 100' to the CM 300 (step S434).

On the basis of the available channel information of the TVBD network or device 100 and the occupied channel information of the neighbor TVBD network or device 100' received from the neighbor CM 300', the CM 300 may generate a priority table (step S436). The available channel information of thee TVBD network or device 100 may be received by the TVBD network or device 100 from the TVWS database 600 and transferred to the CM 300 or the CM 300 may receive the available channel information of the TVBD network or device 100 from the TVWS database 600 or the CDIS/CDB 400 may receive the available channel information of the TVBD network or device 100 from the TVWS database 600 and transfer the same to the CM 300.

The CM 300 may transmit the generated priority table to TVBD network or device 100 (step 8438). The reason for the CM 300 to receive the occupied channel information of the neighbor TVBD network or device 100' from the neighbor CM 300' is to determine a substantial available channel of the TVBD network or device 100.

On the basis of the priority table received from the CM 300, the TVBD network or device 100 determines whether to perform service switching (step S442). Namely, the TVBD network or device 100 checks whether or not there is a desired channel in the channels included in the available channels, and when there is no desired channel, in the available channels, the TVBD network or device 100 determines to switch a service.

In this case, the TVBD network or device 100 requests service switching from the CM 300 (step S444). The CM 300 switches a service in response to the request from the TVBD network or device 100 (step S446). In this case, the CM 300 may transmit a neighbor set to the TVBD network or device 100. In order to secure a desired channel, the TVBD network or device 100 may negotiate with the neighbor CM 300 about an available channel on the basis of the received neighbor set.

Figure 17:
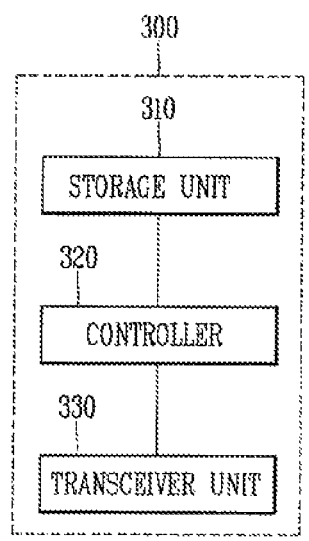
FIG. 17 is a schematic block diagram of the CM 300 according to the present disclosure.

FIG. 17 is a schematic dock diagram of the CM 300 according to the present disclosure.

As shown in FIG. 17, the CM 300 includes a storage unit 310, a controller 320, and a transceiver unit 330.

The storage unit 310 stores the method according to the embodiments illustrated in FIGS. 1 to 16.

The controller 320 controls the storage unit 310 and the transceiver unit 330. In detail, the controller 320 executes the foregoing methods stored in the storage unit 310. The controller 320 transmits the foregoing signals through the transceiver unit 330.

While the present invention has been shown and described in connection with the embodiments, it will be apparent to those skilled in the art that modifications and variations can be made without departing from the spirit and scope of the invention as defined by the appended claims.

The invention claimed is:

1. A method of switching between services of a television band device (TVBD) network or TVBD device, the method comprising:
   receiving a request for switching between services of the TVBD network or TVBD device from a coexistence manager (CM); and
   transmitting a response with respect to the request to the CM,
   wherein the services of the TVBD network or TVBD device include
   an information service in which the TVBD network or TVBD device determines an available channel of the TVBD network or TVBD device and
   a management service in which the CM determines the available channel of the TVBD network or TVBD device,
   wherein the request indicates a switchover between the information service and the management service, and
   wherein the response includes an indicator indicating whether or not the services have been successfully switched.

2. The method of claim 1, wherein neighbor information is information obtained by the CM from the server, and the server determines a neighbor TVBD network or TVBD device interfering with the TVBD network or TVBD device.

3. The method of claim 1, further comprising:
   receiving information regarding operating channels of another CM from the CM.

4. The method of claim 3, wherein the information regarding the operating channels of said another CM is information obtained by the CM from the different CM.

5. The method of claim 1, further comprising:
   transmitting measurement results to the CM.

6. The method of claim 5, wherein the transmitting of the measurement results is transmitting the measurement results to the CM periodically or according to a request from the CM.

7. A method of switching between services of a television band device (TVBD) network or TVBD device, the method comprising:
   transmitting a request for switching between services of the TVBD network or TVBD device to a coexistence manager (CM);
   receiving, by the TVBD network or TVBD device, a response with respect to the request from the CM,
   wherein the services of the TVBD network or TVBD device include
   an information service in which the TVBD network or TVBD device determines an available channel of the TVBD network or TVBD device and
   a management service in which the CM determines the available channel of the TVBD network TVBD device,
   wherein the request indicates a switchover between the information service and the management service, and
   wherein the response includes an indicator indicating whether or not the services have been successfully switched.

8. The method of claim 7, further comprising:
   receiving, by the CM, neighbor information of the TVBD network or TVBD device from a server,
   wherein the server determines a neighbor TVBD network or TVBD device interfering with the TVBD network or TVBD device.

9. The method of claim 7, further comprising:
   receiving information regarding operating channels of another CM from the CM.

10. The method of claim 9, wherein the information regarding operating channels of said another CM is information received by the CM from said another CM.

11. The method of claim 7, wherein further comprising:
    transmitting measurement results to the CM.

12. The method of claim 11, wherein the transmitting of the measurement results is transmitting the measurement results to the CM periodically or according to a request from the CM.

* * * * *